US011005904B2

(12) United States Patent
Denoual et al.

(10) Patent No.: US 11,005,904 B2
(45) Date of Patent: May 11, 2021

(54) METHOD, DEVICE, AND COMPUTER PROGRAM FOR ENCAPSULATING HEVC LAYERED MEDIA DATA

(71) Applicant: CANON KABUSHIKI KAISHA, Tokyo (JP)

(72) Inventors: Franck Denoual, Saint Domineuc (FR); Frédéric Maze, Langan (FR); Cyril Concolato, Combs la Ville (FR); Jean Le Feuvre, Cachan (FR)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 15/323,015

(22) PCT Filed: Jul. 1, 2015

(86) PCT No.: PCT/EP2015/065047
§ 371 (c)(1),
(2) Date: Dec. 29, 2016

(87) PCT Pub. No.: WO2016/001337
PCT Pub. Date: Jan. 7, 2016

(65) Prior Publication Data
US 2017/0171282 A1    Jun. 15, 2017

(30) Foreign Application Priority Data

Jul. 1, 2014  (GB) .................................. 1411731

(51) Int. Cl.
*H04L 29/06*    (2006.01)
*H04N 21/2343*    (2011.01)
(Continued)

(52) U.S. Cl.
CPC ........... *H04L 65/607* (2013.01); *H04N 19/31* (2014.11); *H04N 19/46* (2014.11);
(Continued)

(58) Field of Classification Search
None
See application file for complete search history.

(56) References Cited

U.S. PATENT DOCUMENTS

| 2007/0078954 A1 | 4/2007 | Seo et al. |
| 2015/0110473 A1* | 4/2015 | Wang .................. H04N 19/136 386/341 |

(Continued)

FOREIGN PATENT DOCUMENTS

| CN | 101518087 A | 8/2009 |
| CN | 101675435 A | 3/2010 |

(Continued)

OTHER PUBLICATIONS

Kofler, et al., "Implications of the ISO Base Media File Format on Adaptive HTTP streaming of H.264/SVC", 4th IEEE CCNC, 2012, pp. 549-553, XP002744031, cited in the application, the whole document.

(Continued)

*Primary Examiner* — Clifford Hilaire
(74) *Attorney, Agent, or Firm* — Canon U.S.A., Inc. IP Division

(57) ABSTRACT

The invention relates to a method for encapsulating multi-layer partitioned timed media data in a server, the multi-layer partitioned timed media data comprising timed samples, each timed sample being encoded into a first layer and at least one second layer, at least one timed sample comprising at least one subsample, each subsample being encoded into the first layer or the at least one second layer. The method comprises: obtaining at least one subsample from at least one of the timed samples; creating a track comprising the at least one obtained subsample; and generating a descriptive metadata associated with the created track, the descriptive metadata being organized into one main descriptive box per track, the descriptive information (Continued)

about the organization of the different layers being included into one or more sub-boxes, wherein at most one main descriptive box comprises the one or more sub-boxes.

23 Claims, 3 Drawing Sheets

(51) Int. Cl.
*H04N 21/84* (2011.01)
*H04N 21/854* (2011.01)
*H04N 19/31* (2014.01)
*H04N 19/46* (2014.01)

(52) U.S. Cl.
CPC ..... *H04N 21/234327* (2013.01); *H04N 21/84* (2013.01); *H04N 21/85406* (2013.01); *H04L 2212/00* (2013.01)

(56) References Cited

U.S. PATENT DOCUMENTS

| | | | | |
|---|---|---|---|---|
| 2015/0341649 | A1* | 11/2015 | Narasimhan | H04N 19/34 375/240.12 |
| 2017/0118540 | A1* | 4/2017 | Thomas | H04N 19/167 |
| 2017/0134736 | A1* | 5/2017 | Hirabayashi | H04N 5/76 |

FOREIGN PATENT DOCUMENTS

| | | |
|---|---|---|
| CN | 103098484 A | 5/2013 |
| CN | 103782601 A | 5/2014 |
| WO | 2008/007304 A2 | 1/2008 |
| WO | 2012168365 A1 | 12/2012 |
| WO | 2016002496 A1 | 1/2016 |

OTHER PUBLICATIONS

Wang, et al., "WD3 of ISO/IEC 14496-15 2013/AMD 1 Enhanced support of HEVC and MVC + D",108. MPEG Meeting;Mar. 31, 2014-Apr. 4, 2014, Valencia, (Motion Picture Expert Group or ISO/IEC JTC1/SC29/WG11), No. w14328, May 16, 2014, XP030021065, cited in the application, the whole document.

"Information technology—Coding of audio-visual objects—Part 15: Carriage of NAL unit structured video in the ISO Base Media File Format, Amendment 2: Carriage of high efficiency video coding (HEVC)", Section 8.4: Derivation from ISO base media file format, 102. MPEG Meeting;Oct. 15, 2012-Oct. 19, 2012; Shanghai; (Motion Picture Expert Group or ISO/IEC JTC1/SC29/WG11), No. N13036, Nov. 5, 2012, pp. 1-24, XP002723158, the whole document.

"Information technology—Coding of audio-visual objects—Part 15: Carriage of NAL unit structured video in the ISO Base Media File Format", ISO/IEC 14496-15:2013(E), vol. 2013, No. ISO/IEC 14496-15:2013(E) m31213, Oct. 24, 2013, pp. 1-134, XP030059666, section 6: 11 SVC elementary stream and sample definition.

Amon, et al., "File Format for Scalable Video Coding (SVC)", Joint Video Team (JVT) of ISO/IEC MPEG & ITU-T VCEG(ISO/Iec JTC1/SC29/WG11 and ITU-T SG16 Q6), Oct. 20, 2006, pp. 1-11, XP002459427, the whole document.

Le Feuvre, et al., "Inputs to WD of 14496-15 AMD2",106. MPEG Meeting; Oct. 28, 2013-Jan. 11, 2013; Geneva, (Motion Picture Expert Group or ISO/IEC JTC1/SC29/WG11), No. m31439, Oct. 23, 2013, XP030059891, abstract.

Jean Le Feuvre,et al., Storage of Tiled HEVC Video, ISO/IEC JTC1/SC29/WG11 MPEG2013/M31438, Oct. 2013, Geneva, CH, pp. 1-6.

* cited by examiner

METHOD, DEVICE, AND COMPUTER PROGRAM FOR ENCAPSULATING HEVC LAYERED MEDIA DATA

CROSS REFERENCE TO RELATED APPLICATIONS

This application is a national phase application of PCT application No. PCT/EP2015/065047 filed on Jul. 1, 2015 and which claims the benefit under 35 U.S.C. § 119(a)-(d) of United Kingdom Patent Application No. 1411731.1 filed on Jul. 1, 2014 and entitled "Method, device, and computer program for encapsulating HEVC layered media data". The above cited patent applications are incorporated herein by reference in their entirety.

FIELD OF THE INVENTION

The invention generally relates to the field of encapsulation of timed media data, e.g. according to Base Media File Format as defined by the MPEG standardization organization, to provide a flexible and extensible format that facilitates interchange, management, editing, and presentation of the media data and to improve stream delivery, in particular regarding HTTP (HyperText Transfer Protocol) and RTP (Real-time Transport Protocol) streaming of user-selected regions of interest in compressed video streams. More particularly, the invention concerns a method, device, and computer program for encoding inter-layer dependencies in encapsulating an elementary stream containing multi-layer partitioned data such as spatial tiles allowing efficient streaming or extraction of data, in particular of one or more tiles.

BACKGROUND OF THE INVENTION

Video coding is a way of transforming a series of video images into a compact digitized bit-stream so that the video images can be transmitted or stored. An encoding device is used to code the video images, with an associated decoding device being available to reconstruct the bit-stream for display and viewing. A general aim is to form the bit-stream so as to be of smaller size than the original video information. This advantageously reduces the capacity required of a transfer network, or storage device, to transmit or store the bit-stream code. To be transmitted, a video bit-stream is generally encapsulated according to a transmission protocol that typically adds headers and check bits. Video streaming mechanisms are widely deployed and used over the Internet network and mobile networks to stream audio/video media over HTTP (HyperText Transfer Protocol) such as 3GPP's Adaptive HTTP Streaming (AHS), Microsoft's Smooth Streaming or Apple's HTTP live streaming for instance.

Recently, the Moving Picture Experts Group (MPEG) published a new standard to unify and supersede existing streaming solutions over HTTP. This new standard, called "Dynamic adaptive streaming over HTTP (DASH)", is intended to support a media-streaming model over HTTP based on standard web servers, in which intelligence (i.e. selection of media data to stream and dynamic adaptation of the bit-streams to user choices, network conditions, and client capabilities) relies exclusively on client choices and devices.

In this model, a media presentation is organized in data segments and in a manifest called "Media Presentation Description (MPD)" which represents the organization of timed media data to be presented. In particular, a manifest comprises resource identifiers to use for downloading data segments and provides the context to select and combine those data segments to obtain a valid media presentation. Resource identifiers are typically HTTP-URLs (Uniform Resource Locator), possibly combined with byte ranges. Based on a manifest, a client device determines at any time which media segments are to be downloaded from a media data server according to its needs, its capabilities (e.g. supported codecs, display size, frame rate, level of quality, etc.), and depending on network conditions (e.g. available bandwidth).

It is to be noted that there exist alternative protocols to HTTP, for example the Real-time Transport Protocol (RTP).

In addition, video resolution is continuously increasing, going from standard definition (SD) to high definition (HD), and to ultra-high definition (e.g. 4K2K or 8K4K, that is to say video comprising images of 4,096×2,400 pixels or 7,680×4,320 pixels). However, not all receiving and video decoding devices have resources (e.g. network access bandwidth or CPU (Central Processing Unit)) to access video in full resolution, in particular when video is of ultra-high definition, and not all users need to access such video. In such a context, it is particularly advantageous to provide the ability of accessing only some Regions-of-Interest (ROIs) that is to say to access only some spatial sub-parts of a whole video sequence.

A known mechanism to access spatial sub-parts of frames belonging to a video consists in organizing each frame of the video as an arrangement of independently decodable spatial areas generally referred to as tiles. Some video formats such as HEVC (High Efficiency Video Coding) provide support for tile definition. A user-defined ROI may cover one or several contiguous tiles.

As an alternative, a user may select a ROI if he wants to focus only on a particular detail of the pictures in the video sequences.

Accordingly, for streaming video sequences or the user-selected ROIs according to HTTP protocol, it is important to provide encapsulation of timed media data of an encoded video bit-stream in a way that enables spatial access to one or more tiles and that enables combination of accessed tiles.

It is to be recalled that encoded video bit-streams are organized into NAL (Network Abstraction Layer) units which are generally constructed as a set of contiguous temporal samples that correspond to complete frames, the temporal samples being organized as a function of the decoding order. File formats are used to encapsulate and describe such encoded bit-streams.

For the sake of illustration, the International Standard Organization Base Media File Format (ISO BMFF) is a well-known flexible and extensible format that describes encoded timed media data bit-streams either for local storage or transmission via a network or via another bit-stream delivery mechanism. This file format is object-oriented. It is composed of building blocks called boxes that are sequentially or hierarchically organized and that define parameters of the encoded timed media data bit-stream such as timing and structure parameters. According to this file format, the timed media data bit-stream is contained in a data structure referred to as mdat box that is defined in another data structure referred to as track box. The track represents a timed sequence of samples where a sample corresponds to all the data associated with a single timestamp that is to say all the data associated with a single frame or all the data associated with several frames sharing the same timestamp.

For scalable video such as video of the multi-layer HEVC format, the layered media data organization can be efficiently represented by using multiple dependent tracks, each track representing the video at a particular level of scalability. In order to avoid data duplication between tracks, extractors can be used. According to a standard file format, an extractor is a specific kind of network abstraction layer (NAL) data structure directly included in a bit-stream that enables efficient extraction of other network abstraction layer (NAL) units from other bit-streams. For instance, the bit-stream of an enhancement layer track may comprise extractors that reference NAL units from a base layer track. Then later on, when such enhancement layer track is extracted from the file format, extractors must be replaced by the data that they are referencing.

Several strategies can be adopted when using ISO BMFF embedding these mechanisms to describe sub-information and to ease access to this sub-information or to efficiently organize bit-streams into multiple segments.

For example, in the article entitled "Implications of the ISO Base Media File Format on Adaptive HTTP Streaming of H.264/SVC", the authors, Kofler et al., present three different strategies for organizing a scalable video bit-stream (H264/SVC) for HTTP streaming considering possibilities as well as limitations of the ISO BMFF:

a) a single file containing a particular file header comprising a file type box "ftyp" and a movie box "moov" containing all ISO BMFF metadata (including track definitions), the single file also comprising a single mdat box containing the whole encoded bit-stream. This organization is suitable for local storage but is not adapted to HTTP streaming where a client may only need a part of the whole bit-stream. Such an organization is preferably used for a file used as an initialization file when the bit-stream is fragmented into multiple segments. This initialization file is followed by one other single file whose organization is defined in b), this initialization file gathering information about all the segments;

b) a single file containing multiple moof/mdat boxes suitable for fragmentation each couple of moof/mdat being relative to one of the multiple segments of the bit-streams. This format allows for progressive download. More in detail, the moof box is equivalent to the moov box at fragment level. According to this scheme, using a fragmented media file, the scalable bit-stream can be split into multiple dependent tracks representing the video at different scalability levels. Extractors are specific NAL units used to reference NAL units from other track(s). In case a track per tile is used, all addressable tracks have to be prepared in advance and tracks cannot be selected independently. If several tiles are to be displayed, several bit-streams must be decoded and the base layer is decoded several times. The last organization described in c) is particularly suitable for selected each track independently;

c) multiple segments files, each file being accessible by its own URL and being downloadable independently. Each file is related to one fragment and the multiple segment files are preferably preceded by a dedicated initialization file. Each segment typically consists of a segment type box (styp), which acts as a kind of file header, an optional segment index box (sidx) and one or multiple fragments. Again, each fragment consists of a moof and an mdat box. According to this scheme, using a fragmented media file, each track is stored in its own segment with the associated bit-stream related to one level of scalability. If necessary, extractors are used to reference required bit-stream from dependent tracks. Such a coding scheme is particularly suitable for streaming tracks independently. It is well adapted to the DASH standard but it is not suitable for tile streaming since several bit-streams are to be decoded and thus, one decoder per track is required. Moreover, there is a potential duplication of the base layer's bit-stream when selecting more than one tile.

The definition of the boxes above mentioned as well as the definition of sub-boxes included in those boxes made in reference to the document "WD3 of ISO/IEC 14496-15 2013/AMD1 Enhanced support of HEVC and MVC+D, ISO/IEC JTC1/SC29/WG11, W14328, March-April 2014, Valencia, Spain" (named "w14328" below) may lead to complex and less efficient organization of the ISO BMFF metadata.

Moreover the tile tracks are not properly defined for Layered HEVC, limiting it usage.

To solve these issues, there is provided an efficient data organization and track description scheme suitable especially for handling spatial tiles in Layered HEVC for multi-layer video streams. This ensures that the result of the ISO BMFF parsing is more efficient and adapted to Layered HEVC.

SUMMARY OF THE INVENTION

Faced with these constraints, the inventors provide a method and a device for encapsulating multi-layer tiled timed media data in a server and for providing a timed media data bit-stream from multi-layer tiled timed media data encapsulated in a plurality of media segment files.

It is a broad object of the invention to remedy the shortcomings of the prior art as described above.

According to a first aspect of the invention there is provided a method for encapsulating multi-layer partitioned timed media data in a server, the multi-layer partitioned timed media data comprising timed samples, each timed sample being encoded into a first layer and at least one second layer, at least one timed sample comprising at least one subsample, each subsample being encoded into the first layer or the at least one second layer. The method comprises:

obtaining at least one subsample from at least one of the timed samples;

creating a track comprising the at least one obtained subsample; and generating a descriptive metadata associated with the created track, the descriptive metadata being organized into one main descriptive box per track, the descriptive information about the organization of the different layers being included into one or more sub-boxes, wherein at most one main descriptive box comprises the one or more sub-boxes.

This first aspect of the invention provides simplification in the encapsulating process by making optional some sub-boxes which are unnecessary.

In an embodiment, if each timed samples is encoded into a first layer and only one second layer, none of the main descriptive box comprises said sub-boxes containing the descriptive information about the organization of the different layers.

In an embodiment, when a created track comprising the at least one obtained subsample, each subsample being relating to a single layer, none of the main descriptive box comprises said sub-boxes containing the descriptive information about the organization of the different layers.

In an embodiment, if one main descriptive box comprises said one or more sub-boxes, then a configuration box contained in a main descriptive box related to a second layer and comprising descriptive information for configuring a decoding device according to the encoding method used for encoding the timed samples, includes an index whose value is inferred from an index referring to a predetermined set of parameters for the encapsulating method from one of said sub-box, else if none of the main descriptive boxes comprises said one or more sub-boxes, else the value of the index in the configuration box is set to a default value.

This embodiment allows considering the specific case when the index referring to a predetermined set of parameters for the encapsulating method from one of said sub-box is not available. It allows the encapsulation process to pursue even in this situation.

In an embodiment, the default value is '0'.

In another embodiment if one main descriptive box comprises said one or more sub-boxes, then a configuration box contained in a main descriptive box related to a second layer and comprising descriptive information for configuring a decoding device according to the encoding method used for encoding the timed samples, and if a predetermined flag (for example "operationPointFlag") is set to a predetermined value, then said configuration box includes an index whose value is inferred from an index referring to a predetermined set of parameters for the encapsulating method from one of said sub-box, else if the predetermined flag is set to another value, then said configuration box does not include said index whose value is inferred from an index referring to a predetermined set of parameters for the encapsulating method from one of said sub-box.

In an embodiment, said method being compliant with ISOBMFF part 15.

In an embodiment, one of said sub-box is the 'oinf' sub box.

In an embodiment, one of said sub-box is the 'tcon' sub-box.

9 In an embodiment, the index referring to a predetermined set of parameters for the encapsulating method is the prof_tier_level index.

In an embodiment, the multi-layer partitioned timed media data are multi-layer tiled timed media data, the subsamples being spatial subsamples.

According to a second aspect of the invention there is provided a method for providing a multi-layer timed media data bit-stream from multi-layer partitioned timed media data encapsulated in at least one media segment file, in a server, the multi-layer partitioned timed media data comprising timed samples, each timed sample being encoded into a first layer and at least one second layer, at least one timed sample comprising at least one subsample encoded into at least the first layer or the at least one second layer, the at least one media segment file comprising at least one track comprising at least one subsample obtained from at least one of the timed samples, the at least one media segment file being associated with a descriptive metadata associated with the at least one track, the descriptive metadata being organized into one main descriptive box per first and second layers, the descriptive information about the organization of the different layers being included into one or more sub-boxes. At most one main descriptive box comprises the one or more sub-boxes.

In an embodiment, if each timed samples is encoded into a first layer and only one second layer, none of the main descriptive box comprises said sub-boxes containing the descriptive information about the organization of the different layers.

In an embodiment, the subsamples of one track are related to a single layer, none of the main descriptive box comprises said sub-boxes containing the descriptive information about the organization of the different layers.

In an embodiment, if one main descriptive box comprises said one or more sub-boxes, then a configuration box contained in a main descriptive box related to a second layer and comprising descriptive information for configuring a decoding device according to the encoding method used for encoding the timed samples, includes an index whose value is inferred from an index referring to a predetermined set of parameters for the encapsulating method from one of said sub-box, else if none of the main descriptive boxes comprises said one or more sub-boxes, else the value of the index in the configuration box is set to a default value.

In an embodiment, the default value is '0'.

In another embodiment if one main descriptive box comprises said one or more sub-boxes, then a configuration box contained in a main descriptive box related to a second layer and comprising descriptive information for configuring a decoding device according to the encoding method used for encoding the timed samples, and if a predetermined flag (for example "operationPointFlag") is set to a predetermined value, then said configuration box includes an index whose value is inferred from an index referring to a predetermined set of parameters for the encapsulating method from one of said sub-box, else if the predetermined flag is set to another value, then said configuration box does not include said index whose value is inferred from an index referring to a predetermined set of parameters for the encapsulating method from one of said sub-box.

In an embodiment, said method being compliant with ISOBMFF part 15.

In an embodiment, one of said sub-box is the 'oinf' sub box.

In an embodiment, one of said sub-box is the 'tcon' sub-box.

In an embodiment, the index referring to a predetermined set of parameters for the encapsulating method is the prof_tier_level index.

In an embodiment, the multi-layer partitioned timed media data are multi-layer tiled timed media data, the subsamples being spatial subsamples.

According to a third aspect of the invention there is provided a computer program product for a programmable apparatus, the computer program product comprising instructions for carrying out each step of the method as mentioned above when the program is loaded and executed by a programmable apparatus.

According to a fourth aspect of the invention there is provided a computer-readable storage medium storing instructions of a computer program for implementing the method as mentioned above.

According to a fifth aspect of the invention there is provided a device for encapsulating multi-layer partitioned timed media data in a server comprising means adapted for carrying the encapsulating method as mentioned above.

According to a sixth aspect of the invention there is provided a device for encapsulating multi-layer partitioned timed media data in a server comprising means adapted for carrying the providing method as mentioned above.

In an embodiment it is incorporated in a server device.

According to a seventh aspect of the invention there is provided a method for encapsulating multi-layer tiled timed media data in a server, multi-layer tiled timed media data comprising timed samples, each timed sample being encoded into a first layer and at least one second layer, at least one timed sample comprising at least one spatial subsample, each subsample being encoded into the first layer or the at least one second layer. The method comprises:

obtaining at least one subsample from at least one of the timed samples;

creating a track comprising the at least one obtained subsample; and generating a descriptive metadata associated with the created track, the descriptive metadata being organized into one main descriptive box per track, the descriptive information about the organization of the different layers being included into sub-boxes, wherein if the main descriptive box is related to a track resulting from the encapsulation of a subsample being encoded into the at least one second layer, then at least one sub-box of said main descriptive box comprises a type parameter for signalling that the media data are multi-layer tiled media data.

This new type of parameter allows a parser to immediately recognize that it refers to tile track in particular in multi-layer media.

In an embodiment, the subsamples are encoded using a multi-layer extension of HEVC standard.

In an embodiment the type parameter is 'lht1'.

In an embodiment, the type parameter is included in a second configuration sub-box contained in said main descriptive box related to a track resulting from the encapsulation of a subsample being encoded into the at least one second layer, said second configuration sub-box comprising descriptive information for configuring a decoding device according to the encoding method used for encoding the timed samples.

In an embodiment the descriptive information of said second configuration sub-box is adapted to the ISOBMFF standard.

According to a seventh aspect of the invention there is provided a method for providing a multi-layer timed media data bit-stream from multi-layer partitioned timed media data encapsulated in at least one media segment file, in a server, multi-layer tiled timed media data comprising timed samples, each timed sample being encoded into a first layer and at least one second layer, at least one timed sample comprising at least one subsample encoded into at least the first layer or the at least one second layer, the at least one media segment file comprising at least one track comprising at least one subsample obtained from at least one of the timed samples, the at least one media segment file being associated with a descriptive metadata associated with the at least one track, the descriptive information being divided into sub-boxes, wherein if the main descriptive box is related to a track related to a subsample being encoded into the at least one second layer, then at least one sub-box of said main descriptive box comprises a type parameter for signalling that the media data are multi-layer tiled media data.

In an embodiment, the subsamples are encoded using a multi-layer extension of HEVC standard.

In an embodiment, the type parameter is 'lht1'.

In an embodiment, the type parameter is included in a second configuration sub-box contained in said main descriptive box related to a track resulting from the encapsulation of a subsample being encoded into the at least one second layer, said second configuration sub-box comprising descriptive information for configuring a decoding device according to the encoding method used for encoding the timed samples.

In an embodiment, the descriptive information of said second configuration sub-box is adapted to the ISOBMFF standard.

According to an eighth aspect of the invention there is provided a computer program product for a programmable apparatus, the computer program product comprising instructions for carrying out each step of the method mentioned above when the program is loaded and executed by a programmable apparatus.

According to a ninth aspect of the invention there is provided a computer-readable storage medium storing instructions of a computer program for implementing the method as mentioned above.

According to a tenth aspect of the invention there is provided a device for encapsulating multi-layer partitioned timed media data in a server comprising means adapted for carrying the encapsulating method as mentioned above.

According to an eleventh aspect of the invention there is provided a device for encapsulating multi-layer partitioned timed media data in a server comprising means adapted for carrying the providing method as mentioned above.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention will now be described, by way of example only, and with reference to the following drawings in which.

DETAILED DESCRIPTION OF EMBODIMENTS OF THE INVENTION

Figure 1:
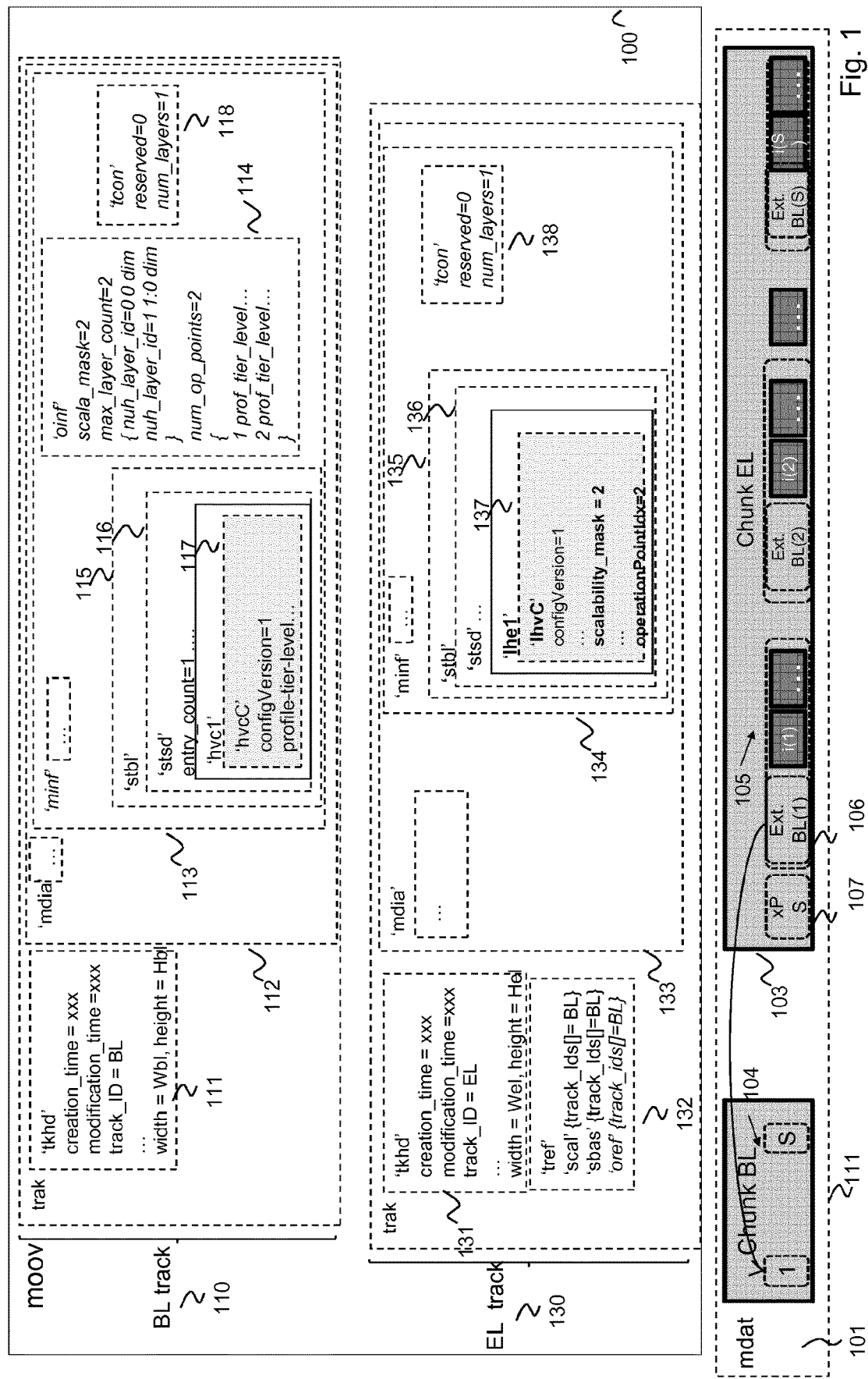
FIG. 1 illustrates en embodiment representing track boxes according to the invention for Layered-HEVC.

The three parts below describe known information about three different features, respectively the spatial organization of pictures (part A), the NAL units (part B), and the specific descriptor called VisualSampleEntry (part C). Those features are described here for a better understanding of the embodiments represented on FIGS. 1 to 3.

Part A

The video is preferably scalable or a multiview video and organized in different levels of scalability/views.

According to a particular embodiment, multi-layer partitioned timed media data such as multi-layer tiled timed media data (e.g. scalable or multiview tiled video data) comprising timed samples (e.g. images) are transmitted as a set of several timed media data tracks, typically base tracks and tile tracks. Still according to a particular embodiment, the base tracks comprise a base layer base track and at least one enhancement layer base track. Additional tile tracks may be base layer tile tracks and/or enhancement layer tile tracks. Each timed media data track comprises one spatial subsample (e.g. several NAL units) of several timed samples. Each video frame (timed sample) may be composed of independently decodable tiles corresponding to spatial sub-parts (spatial subsamples) of the video frame. In Layered HEVC, each video frame may be composed of dependently decodable layers corresponding to spatial sub-part (spatial subsamples) of the video frame. In addition in Layered HEVC each video frame may be composed of dependently decodable layers and each layer may be composed of independently decodable tiles (for a given layer) corresponding to spatial sub-parts (spatial subsamples) of the video frame.

A list is used to describe track dependencies (tiling, inter-layer and/or intra-layer dependencies). Such a set of timed media data tracks allows the selecting, composing, and efficient streaming of multi-layer spatial video tiles. Each track can be transmitted from a server device to a client device as a set of media segment files. An initialization segment file can be used to transmit metadata required to decode media segment files.

An embodiment of the invention can apply, for example, to the video format known as HEVC or Layered HEVC (also known as LHVC or multi-layer HEVC).

It is reminded that according to the HEVC standard, images can be spatially divided into tiles, slices, and slice segments. In this standard, a tile corresponds to a rectangular region of an image that is defined by horizontal and vertical boundaries (i.e., rows and columns). It contains an integer number of Coding Tree Units (CTUs). Therefore, tiles can be efficiently used to identify regions of interest by defining, for example, positions and sizes for regions of interest. However, the structure of an HEVC bit-stream as well as its encapsulation as Network Abstract Layer (NAL) units are not organized in relation to tiles but are based on slices.

In the HEVC standard, slices are sets of slice segments, the first slice segment of a set of slice segments being an independent slice segment, that is to say a slice segment whose general information stored within a header does not refer to that of another slice segment. The other slice segments of the set of slice segments, if any, are dependent slice segments (i.e. slice segments whose general information stored within a header refers to that of an independent slice segment).

A slice segment contains an integer number of consecutive (in raster scan order) Coding Tree Units. Therefore, a slice segment can be of a rectangular shape or not and so, it is not suited to represent a region of interest. It is encoded in an HEVC bit-stream for a slice segment header followed by slice segment data. Independent and dependent slice segments differ by their header: since a dependent slice segment depends on an independent slice segment, the amount of information of its header is smaller than the one of an independent slice segment. Both independent and dependent slice segments contain a list of entry points in the corresponding bit-stream that are used to define tiles or as entropy decoding synchronization points.

According to the HEVC standard, slice segments are linked to tiles according to rules that may be summarized as follows (one or both conditions have to be met):
- all CTUs in a slice segment belong to the same tile (i.e. a slice segment cannot belong to several tiles); and
- all CTUs in a tile belong to the same slice segment (i.e. a tile may be divided into several slice segments provided that each of these slice segments only belongs to that tile).

Part B

As mentioned above, while tiles can be considered as an appropriate support for regions of interest, slice segments are the entities that are actually put in NAL units for transport over a communication network and aggregated to form access units (i.e. coded picture or samples at file format level).

It is to be recalled that according to the HEVC standard, the type of a NAL unit is encoded in two bytes of the NAL unit header that can be defined as follows:

```
nal_unit_header ( ) {
    forbidden_zero_bit
    nal_unit_type
    nuh_layer_id
    nuh_temporal_id_plus1
}
```

NAL units used to code slice segments comprise slice segment headers indicating the address of the first CTU in the slice segment thanks to a slice segment address syntax element. Such slice segment headers can be defined as follows:

```
slice_segment_header ( ) {
    first_slice_segment_in_pic_flag
    if(nal_unit_type >= BLA_W_LP && nal_unit_type <= RSV_IRAP_VCL23)
        no_output_of_prior_pics_flag
    slice_pic_parameter_set_id
    if(!first_slice_segment_in_pic_flag){
        if(dependent_slice_segments_enabled_flag)
            dependent_slice_segment_flag
        slice_segment_address
    }
    If(!dependent_slice_segment_flag){
    [...]
```

Tiling information is provided in a PPS (Picture Parameter Set) NAL unit. The relation between a slice segment and a tile can then be deduced from these parameters.

While spatial predictions are reset on tile borders (by definition), nothing prevents a tile to use temporal predictors from a different tile in the reference frame(s). Accordingly, to build independent tiles, motion vectors for the prediction units are advantageously constrained inside a tile, during encoding, to remain in the co-located tile in the reference frame(s). In addition, the in-loop filters (deblocking and sample adaptive offset (SAO) filters) are preferably deactivated on the tile borders so that no error drift is introduced when decoding only one tile. It is to be noted that such a control of the in-loop filters is available in the HEVC standard. It is set in slice segment headers with a flag known as loop_filter_across_tiles_enabled_flag. By explicitly setting this flag to zero, the pixels at the tile borders cannot depend on pixels that fall on the border of the neighbor tiles. When these two conditions relating to motion vectors and to in-loop filters are met, tiles can be considered as "independently decodable tiles" or "independent tiles".

Part C

An existing sample grouping mechanism of the MPEG-4 Part 12 standard can be used to encapsulate tiles. Accordingly, a specific sample group description is created with a tile descriptor that is a specific kind of the standard VisualSampleGroupEntry descriptor. Sample grouping mechanisms are used for representing partitions of samples in a track. They rely on the use of two boxes: a SampleToGroup box ('sbgp') that describes the assignment of samples to sample groups and a SampleGroupDescription box ('sgpd') that describes common properties of samples within a particular sample group. A particular type of sample grouping is defined by the combination of one SampleToGroup box and one SampleGroupDescription box via a type field ('grouping_type'). Multiple sample grouping instances (i.e. pairs of SampleToGroup and SampleGroupDescription boxes) can exist based on different grouping criteria.

A particular grouping criterion related to the tiling of samples is used. This particular grouping type, called 'trif', describes the properties of a tile and is derived from the standard VisualSampleGroupEntry. It can be referred to as TileRegionSampleGroupEntry and is defined as follows:

```
class TileRegionGroupEntry ( ) extends VisualSampleGroupEntry ('trif') {
   unsigned int(16) groupID;
   unsigned int(2) independent;
   unsigned int(6) reserved=0;
   unsigned int(16) horizontal_offset;
   unsigned int(16) vertical_offset;
   unsigned int(16) region_width;
   unsigned int(16) region_height;
}
```

According to this particular type of group entry, parameter groupID is a unique identifier for the tile described by the group. Parameters horizontal_offset and vertical_offset are used to set a horizontal and a vertical offset, respectively, of the top-left pixel of the rectangular region represented by the tile, relative to the top-left pixel of the HEVC frame, in luma samples of the base region. Parameters region_width and region_height are used to set the width and height, respectively, of the rectangular region represented by the tile, in luma samples of the HEVC frame.

A parameter independent is a 2-bit word that specifies that the tile comprises decoding dependencies relating to samples only belonging to the same tile, as described above by reference to the definition of independent tiles. For the sake of illustration and referring to a standard use of SEI messages (Supplemental Enhancement Information) for describing tile organization, the flag known as tile_section_exact_match_flag can be used to set the value of the independent flag whose meaning can be set as follows:
- if parameter independent equals 0, the coding dependencies between this tile and other tiles in the same frame or previous frames is either described at the tile set level or unknown;
- if parameter independent equals 1, there are no temporal coding dependencies between this tile and the other tiles with different groupID in any reference frames but there can be coding dependencies between this tile and the tile with the same groupID in the reference frames, and
- if parameter independent equals 2, there are no coding dependencies between this tile and other tiles in the same frame, and no coding dependencies between this tile and any other tiles in the reference frames, the independent parameter value 3 being reserved.

The properties of each tile are given once in the movie header ('moov' box) by defining, for each tile track, one SampleGroupDescription box ('sgpd') with the 'trif' grouping_type and a TileRegionGroupEntry. Tile properties can also be defined per track fragment. Such a mp4 track can be defined as a video tile track or tile track. According to the HEVC standard, an HEVC tile track is a video tile track for which there is a reference to an HEVC track carrying the other NALUs (typically set up information such as various parameter sets) of the HEVC layer to which the tile(s) in this track belong. The reference can use values already defined in the MPEG-4 Part 15 standard such as the 'sbas' four character code, or a more specific one such as 'tbas', to indicate tile base track.

One tile track shall either have one and only one TileRegionGroupEntry and no TileSetGroupEntry or one and only one TileSetGroupEntry and one or more dependent TileRegionGroupEntry from which this tile set is made, a TileSetGroupEntry being an extension of a TileRegionGroupEntry to described a set of tiles. It is to be noted that each of these groups is assigned a unique identifier, which can be used to associate a NALU to a group. Tile regions and tile sets share the same namespace for groupID, scoped by the base HEVC layer, as indicated by 'tbas' track reference (i.e. there shall not be two tile regions or tile sets with the same groupID in any tracks having the same base layer).

Introducing a new kind of track here, the tile track, implies to define the corresponding sample entries in order to comply with File Format design. Indeed, each track must contain among its descriptive data, a SampleTableBox ('stbl') with a mandatory SampleDescriptionBox ('stsd'). The sample description table gives detailed information about the coding type used, and any initialization information needed for the decoding of the track samples. Information stored in the SampleDescriptionBox is track specific and is described for video tracks by specializing the abstract description for any visual sample entry. Typically, any visual sample entry contains a "coding name" parameter providing the compression format decoder to use to handle the samples. This parameter must be a unique identifier encoded as a four character code. In order to describe the samples put in the tile tracks, we then have to describe these samples with a specific kind of VisualSampleEntry. The HEVCTileSampleEntry is introduced, represented for example by the code 'hvt1' to indicate that an HEVC decoder with tile capabilities is required to process the samples of the tile track. Usually, in sample description table, a ConfigurationBox is included as parameter to provide decoder configuration information. For the specific case of HEVC tile tracks, we do not duplicate the configuration box but rather inherits the one described in the tile base track indicated in the track reference type 'tbas' in the track header. Optionally, a parameter describing an average bitrate per tile can be set in the HEVCTileSampleEntry as well as profile, tier and level information. A profile defines a subset of the standard in terms of features, typically targeting application domains. Each profile defines tiers and levels. Tiers can be viewed as nested complexity levels, each level defining limits for some values like number of pixels, number of slices, tiles . . . . Organized into increasing complexity, a decoder than can handle the highest tier at a given level in a profile will be able to support any lower tier at same level or below in the same profile. It can be useful to store per-tile bitrate information in this box, so as to be provided to streaming client for an adaptation based on the bandwidth. As for most of mp4 boxes, the HEVCTileSampleEntry box can be extended with optional extra boxes to match application specific needs.

FIG. 1 illustrates an example of encapsulating two scalability layers according to the MPEG-4 file format. As illustrated, each layer (enhancement layer EL and base layer BL) is encapsulated in its own track, enabling efficient data addressing and leading to encapsulating the video as two tracks.

More precisely, FIG. 1 represents a movie box "moov" 100 containing all ISO BMFF metadata for a media data sequence encoded into a multi-layer HEVC bit stream and containing S samples. The same principles would apply to media data encapsulated with movie fragments or as segments as defined in b) and c) page 3. A single "mdat" box 101 contains the whole encoded bit-stream organized into two chunks, one for the base layer 102 and one for the enhancement layer 103, each chunk containing the S samples 104, 105. For the enhancement layer EL, the chunkEL 103 comprises the corresponding portion of the encoded bitstream for the S samples. Each sample is organized into one or more NAL units. Moreover a specific NAL unit is added at the beginning of the portion for including an extractor 106 in order to reference the corresponding portion in the base layer chunk. Finally, the enhancement layer chunk comprises the different parameter sets (summarized as "xPS" 107) for defining the parameter at a given "x" level, for example picture level (PPS) or sequence level (SPS).

The "moov" box 100 comprises two boxes "track", one being dedicated to a base layer track 110 (resulting from a base layer encapsulation) and one being dedicated to an enhancement layer track 130 (resulting from a enhancement layer encapsulation).

Each layer track describes its respective S samples illustrated in the mdat box 101.

The base layer track 110 comprises several boxes that are sequentially or hierarchically organized and that define parameters of the encoded above mentioned encoded portion of bit-stream. For the sake of clarity, only a selection of boxes is illustrated in FIG. 1.

A box or sub-box named 'tkhd' for track header 111 comprises the temporal, spatial and identifying information. The temporal information concerns the creation and modification times of the S samples (creation_time, modification_time). The identifier (track_ID) here equal to "BL", allows identifying the track. The spatial information comprises display size information (width and heigth) of the base layer.

Another box or sub-box named 'mdia' 112 is a media information description box and comprises information about the media data related to the S samples of bitstream.

The 'mdia' box comprises some header boxes which are not represented for sake of clarity and a media information box 'miff' 113 which contains the descriptive information itself. In this example, the 'minf' box is sub-divided into three different boxes or sub-boxes.

A first box or sub-box 'oinf' 114 contains operation point information such as the layers and sub-layers (for instance temporal sub-layers) and their organization constituting the operation point, dependencies (if any) between them, a prof_tier_level parameter reflecting the profile, tier and level information contained in the VPS of the HEVC bitstream for the operation point. More in detail, the box 'oinf' comprises a parameter ((scala_mask) giving information about the scalability structure, the number of layers, here two (max_layer_count=2) and for each layer, an identifier, the list of dependent layers followed by the number of operation points in the file, each described by profile/tier and level information and by the set of layers composing this operation point.

A second box or sub-box called 'stbl' box 115 for Sample Table Box contains information describing the samples. Part of the information, relative to the High Efficiency Video Coding (HEVC) method, is included in an 'stsd' box 116 or sub-box for Sample Description Box. The parameter "entry_count" indicates that only one (Visual) Sample Entry is included. The four bytes 'hvc1' indicate that the bit-stream corresponding to the considered media data is compliant and usable by an HEVC decoder operating under the configuration (including profile, tier, and level) given in a HEVC-DecoderConfigurationRecord defined below in the 'hvcC' box 117. In this example, the version configuration is the first one (configVersion=1). The HEVCDecoderConfigurationRecord also gives the profile, tier and level information contained in the Video Parameter Set of the HEVC bitstream.

The third box or sub-box named 'tcon' 118 lists all the layers and sub-layers carried in the track, here only one (num_layers=1). The reserved parameter always has the 0 value for further evolution of the box.

According to a preferred embodiment, the 'oinf' box and/or the 'tcon' box are optional, the optionality being signaled by the use of italic type. For example, when there is only one enhancement layer, the two above mentioned boxes 'oinf' 114 and 'tcon' 118 (or only one of those boxes) are not present in the file. Indeed it has been noticed that operation point information is not useful as all tier/profile/level information for the enhancement level would be included in the track carrying the layer, especially in the sample description box. Thus 'oinf' box and/or the 'tcon' are not mandatory.

Other information related to the organization of the layers may be optional like the different kinds of sample entries: 'shv1', 'she1', 'shvC' and any four character code for scalable HEVC only as well as the 'mhv1', 'mhe1', 'mhvC' and any four character code dedicated to only multiview HEVC sample entries. Only one or two kinds of sample entries can be kept: 'lhv1', 'lhvC' or 'lhe1' for example or any four character code to describe layered HEVC samples entries.

The other track is dedicated to the enhancement layer 130. It comprises a track header box 'tkhd' 131 or sub-box which is similar to the 'tkhd' box of the base layer track, expect that le track_ID is "EL" for enhancement layer.

The track for enhancement layer comprises a Track Reference Box 'tref' 132 or sub-box. It provides a reference from the containing track here the enhancement layer track to another track, here the base layer track, in the presentation.

A first reference 'sbas' indicates that the track of the base layer 110 is the base track for the enhancement track 130. (track_ids[ ]=BL).

Another reference 'oref' allows referring to the 'oinf' box, here put in the base layer track. The 'oref' reference is written by using italic type. Indeed as explained below, 'oref' reference may be optional if there is only one reference layer, given the 'oinf' box is not present in the base layer track.

As for the base layer track, the enhancement layer track comprises a 'mdia box' 133 including an 'minf' box 134. This 'miff' box comprises an 'stbl' box 135 itself including an 'stsd' box. This last box comprises four bytes 'lhe1' for example, which indicate that the bit-stream corresponding to the considered media data is compliant and usable by an L-HEVC decoder operating under the configuration (including profile, tier, and level) given in configuration box defined below in the 'lhvC' box 137.

This 'lhvc' box is described more in detail below.

Finally as for the base layer track the 'mdia' box comprises an optional 'tcon' box 138.

According to the preferred embodiment mentioned above, based on a predefined condition (for example only one enhancement layer) the 'tcon' box can be removed from the track as for the reference to the 'oinf' box via the 'oref' reference in the 'tref' box.

More generally, the 'oinf' and 'tcon' boxes are optional if each layer meaning the base layer and each one of the several enhancement layers are encapsulated into a separate track. Indeed, for typical configurations when one layer corresponds to one operation points, these boxes do not provide any useful information: the 'tcon' box would just indicate that there is one layer in the track while the 'oinf' would describe each track (since track matches layer that itself matches operation point). The profile/tier/level information found in the 'oinf' box can be directly read from the LHEVCDecoderConfigurationRecord. As well, the list of dependent layers (i.e. tracks in this case) can be found via the Track Reference Box. The 'oinf' and 'tcon' boxes may be only useful when one track results from the encapsulation of several layers.

According to another preferred embodiment, for a set of tracks with a common 'sbas' track reference, there is at most one track among this set that carries the 'oinf' box. If an 'oinf' box is present, all tracks with a common 'sbas' referenced track shall be linked to the track that carries the 'oinf' box by using the 'oref' type track reference."

The 'lhvC' box comprises an index named operationPointIdx. This field signals the index of the operation point documented in the operation point information box 'oinf' when existing. An operation point represents a portion of an L-HEVC bit stream which can be obtained by sub-bitstream extraction process. Every valid operation point can be decoded independent of other operation points.

In a preferred embodiment operationPointIdx shall be the 1-based index of the operation point described in the oinf box (here '2' for the enhancement level), or 0 if unknown or not specified.

According to another embodiment, concerning the decoder configuration information, there is a field called hevc_baselayer_flag to indicate whether the base track is encoded with HEVC or not (layered HEVC can be used on top of AVC, Advanced Video Coding format). This information can be found from track references: if the track referred to by 'sbas' reference is not an HEVC track, then the base layer is not HEVC. This flag can be used to make optional another parameter: the operation point index at the end of the decoder configuration information 137, especially when the box for operation point info is not present. By doing so, the LHEVCDecoderConfigurationRecord would be defined as follows:

```
aligned(8) class LHEVCDecoderConfigurationRecord {
    unsigned int(8) general_level_idc;
    bit(1) complete_representation;
    // previous bit for "hevc_baselayer_flag";
    bit(2) reserved = '11'b;
    unsigned int(12) min_spatial_segmentation_idc;
    bit(1) operationPointFlag;
    if (operationPointFlag==1) {
        bit(16) operationPointIdx;
    }
    ... // rest of the decoder configuration information
    // with unsigned int(16) operationPointIdx removed at the end.
```

This new structure does not increase the size of the decoder configuration information and avoids having to set a default value for the operationPointIdx.

The document w14328 mentioned above, currently defines the LHEVCDecoderConfigurationRecord without indicating the type of scalability used in the bitstream. If a generic 'lhv1'/'lhe1' is to be used, as currently defined in w14328, a file reader at the client side has to parse the video parameter set (VPS) extensions to understand the scalability type. This VPS may be in the NALU 107 the chunk. This is a complicated process.

According to a preferred embodiment, it is proposed a new LHEVCDecoderConfigurationRecord which include a 16 bits of scalability mask named 'scalability_mask' (see box 137). According to another embodiment, the scalability mask could be represented on n bits, n being an integer, provided that the whole structure remains aligned on an integer number of bytes. For example n=8 as in HEVC specification.

The LHEVCDecoderConfigurationRecord comprises a field named "general_level_idc" defined in w14328, which is not represented for the sake of clarity. The field "general_level_idc" gives information on the maximum number of pixels, and possible tiles and slices.

According to a preferred embodiment of the invention, It is proposed to add another parameter in the decoder configuration record to disambiguate the kind of layered HEVC that is required to decode the samples, for example after the "general_level_idc" parameter:

```
"
    unsigned int(8) general_level_idc;
    unsigned int(16) scalability_mask;
    bit(1) complete_representation;
"
```

The value of "scalability_mask" ('2' in this example" indicates a scalability of type spatial or quality. This field has the advantage to help a client to detect if the scalability type is supported and to determine whether it will able to play the file. When not able to play the file, it can then select a lower operation point, like for example only the base layer track.

Figure 2:
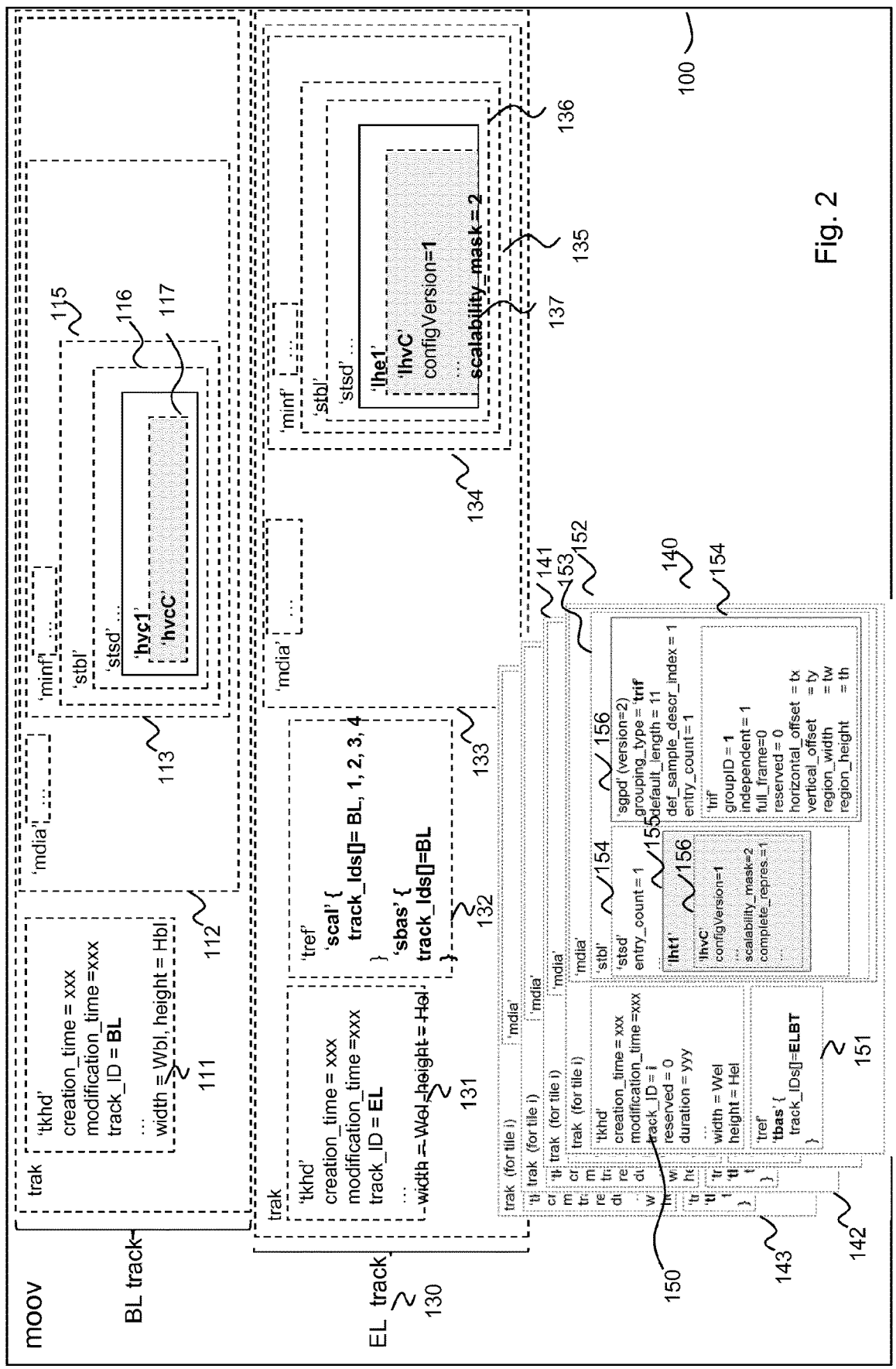
FIG. 2 illustrates en embodiment representing track boxes according to the invention for tiled Layered-HEVC.

FIG. 2 illustrates an example of encapsulating two scalability layers according to the ISO-Base Media File Format when pictures of only the enhancement layer of considered pictures is divided into four tiles. The encapsulation delivers four additional tile tracks (140-143) or enhancement tile tracks ELTT.

In a similar way to HEVC tile tracks, it is possible to define Layered-HEVC tile tracks to allow efficient access of spatial subparts of an enhancement layer. For such cases, according to an embodiment of the invention, specific tracks are created with specific samples using a LHEVCTileSampleEntry sample description format.

An LHEVC tile track is a video track for which there is a 'tbas' reference to the LHEVC track carrying non video coding layers' NALUs of the HEVC layer to which the tile(s) in this track belong. According to an embodiment of the invention a new sample description type is defined: 'lht1'.

According to an embodiment of the invention, neither the samples of the tile track nor the sample description box shall contain VPS, SPS or PPS NAL units, these NAL units shall be in the samples or in the sample description box of the track containing the associated layer, as identified by the track reference type 'tbas' (the enhancement layer track 130 in the FIG. 2).

According to an embodiment of the invention, both the LHEVC tile track and the track or layer track containing the associated layer, as indicated by the 'tbas' track reference, use extractors, as defined in Annex B of w14328, to indicate how the original bitstream is reconstructed. The presence of extractors in these tile tracks may be constrained in some application domains, for example it may be preferable to put extractors in the tile base track rather than in each tile track, especially to allow selection of a subset of tiles to decode and play. Or in case of multiple tiled layers, the description size is reduced when placing extractors only in tile base tracks.

An LHEVC sample stored in a tile track is a complete set of slices for one or more tiles, as defined in ISO/IEC 23008-2. Typically if the tile track refers to a single tile, only the slice(s) used to code this tile is(are) found in the sample. A tile track typically includes one TileRegionGroupEntry (single-tile track), or one TileSetGroupEntry and one or more dependent TileRegionGroupEntry this tile set is made of (multi-tile track), already defined for HEVC.

An LHEVC sample stored in a tile track is considered as a "sync" sample, synchronization sample for random access like seeking for example, if the VCL NAL units in the sample indicate that the coded slices contained in the sample are Instantaneous Decoding Refresh (IDR) slices, Clean Random Access (CRA) slices, or Broken Link Access (BLA) slices.

Sub-sample and sample grouping defined for regular LHEVC (in w14328) samples have the same definitions for an LHEVC tile sample.

According to an embodiment of the invention, an implementation may decide to decode only a subset of the complete tiles of an HEVC sequence. In this case, it may use the tile dependency information in the TileRegionGroupEntry and TileSetGroupEntry sample group descriptions to discard un-needed tracks or ignore some extractors while decoding the HEVC sequence.

In FIG. 2, the elements having the same reference as in FIG. 1 are similar. Moreover, for sake of clarity only the 'moov' box is represented.

In FIG. 2 the 'moov' box comprises additional track boxes which are four tile track boxes 140, 141, 142, 143. Only tile track 141 is described here. The other tile track boxes can be easily deduced.

The tile track box comprises a 'tkhd', Track Header box or sub-box 150, which has the same characteristics as the 'tkhd' boxes 111 or 131 belonging to the BL and EL layer track boxes.

The tile track box comprises a 'tref', Track Reference box or sub-box 151, which has the same characteristics as the 'tref' boxes belonging to the BL and EL layer track boxes, except that:

It contains the four bytes 'tbas' to indicate a relationship to a tile base track, and the identifier track_IDs[ ] indicates that the tile base track for this track is the enhancement tile track having the identifier "ELBT".

The tile track box comprises an minf (not represented for sake of clarity) box with an 'mdia' box 152, an 'stbl' box or sub-box 153, an 'stsd' box or sub-box 154 as the BL and EL track.

The 'stbl' box 153 comprises two boxes or sub-boxes associating properties to the track samples: 'sgpd' 156 and 'trif' 154 included in 'sgpd'. These boxes are well defined in w14328.

'sgpd' is a a SampleGroupDescription box that describes common properties of samples within a particular sample group. Here, the parameter "def_sample_descr_index" indicates the default property applying to all samples of the track: the first (and only one in the 'trif' box).

'trif' is a TileRegionGroupEntry box which comprises the information about the considered tile. In this case, the considered tile is identified by the groupID with value '1' and its position and size are respectively defined by "horizontal_offset", "vertical_offset" and "region_width", "region_height". The reserved parameter has no meanings and the independent flag indicates whether the tile is self-contained (i.e does not need any other tiles to be reconstructed). Finally, the full-frame parameter indicates whether the tile covers the whole picture (1) or not (0).

According to an embodiment of the invention, four bytes defining a new sample entry 155 indicate that the bit-stream corresponding to media data or samples of an LHEVC tile track, is compliant and usable by an HEVC decoder operating under the configuration (including profile, tier, and level) given in a DecoderConfigurationRecord or more specifically a LHEVCDecoderConfigurationRecord defined below in the 'lhvC' box 156.

In an embodiment the four bytes are: 'lht1'.
The definition of this new sample entry can be the one below:

"

Box Types: 'lht1'
Container: Sample Description Box ('stsd')
Mandatory: No
Quantity: Zero or more sample entries may be present

"

The definition of the new sample entry allows a parser to immediately recognize that it refers to an LHEVC tile track. This was not allowed with the existing sample entries.

Moreover some specific properties only related to tile tracks can be introduced.

As stated above, this sample entry describes media samples of an LHEVC tile track. The width and height of VisualSampleEntry for an LHEVC tile track (sample entry type 'lht1') shall be set to the maximum width and height of the Tile(s) or TileSet(s) contained in the track. The layout information in the track header (i.e., layer, matrix for positioning the tiles, width and height) of a tile track shall be identical to the track header information of the associated reference track (also called tile base track) as identified by the 'tbas' track reference, and otherwise ignored.

Preferably any 'clap' (meaning Clean Aperture) and 'pasp' (meaning Pixel Aspect Ratio) box in an 'lht1' sample description shall be ignored.

Accordingly, a specific sample description is created for an LHEVC tile descriptor that is a specific kind of the standard VisualSampleGroupEntry descriptor

```
class LHEVCTileSampleEntry ( ) extends VisualSampleEntry ('lht1'){
    MPEG4BitRateBox ( );
    extra_boxes  boxes;
}
Both MPEG4BitRateBox and extra_boxes are optional.
```

Preferably the LHEVCTileSampleEntry does not contain any LHE VCConfigurationBox (or LHVCConfigurationBox or any name to designate the configuration box for the layered HEVC format), HEVCConfigurationBox or MPEG4ExtensionDescriptorsBox. Indeed these boxes are found in the tile base LHEVC track sample description, as indicated by the 'tbas' track reference type.

Other optional boxes may be included in the LHEVC-TileSampleEntry. Usually, there are as many entries in the SampleDescriptionBox of an LHEVC tile track as there are entries in the SampleDescriptionBox of the tile base LHEVC track. SampleDescriptionBox is a well-known descriptor of an HEVC tile track, containing descriptive information about the HEVC tile track.

The sub-parameters for the MIME type todecs' parameter for LHEVC Tile Track follows the rules defined in annex E.3 of w14328 defining the standard. The decoder configuration record is taken from the base track sample description, as indicated by the 'tbas' track reference type. The sub-parameters for the MIME type todecs' are then constructed using this decoder configuration record.

Preferably, codec sub-type parameters for L-HEVC are identical to HEVC ones with the following exception: if the codec type identifies a generic L-HEVC media samples of an LHVC tile track (i.e. 'lhv1' code points), the constructed HEVC codec parameter shall have ".SXX" appended to, "S" indicating the scalability type and "XX" are the bytes corresponding to the value of the scalability mask for this track; the trailing byte may be omitted if zero. This can be useful for example in DASH Representations to have precise information on the codec used to encode the associated video. For example, in a multi-view streaming application, the DASH client having a multi-layer HEVC decoder would not select a Representation declared with a codec parameter indicating a spatial or quality scalability.

Figure 3:
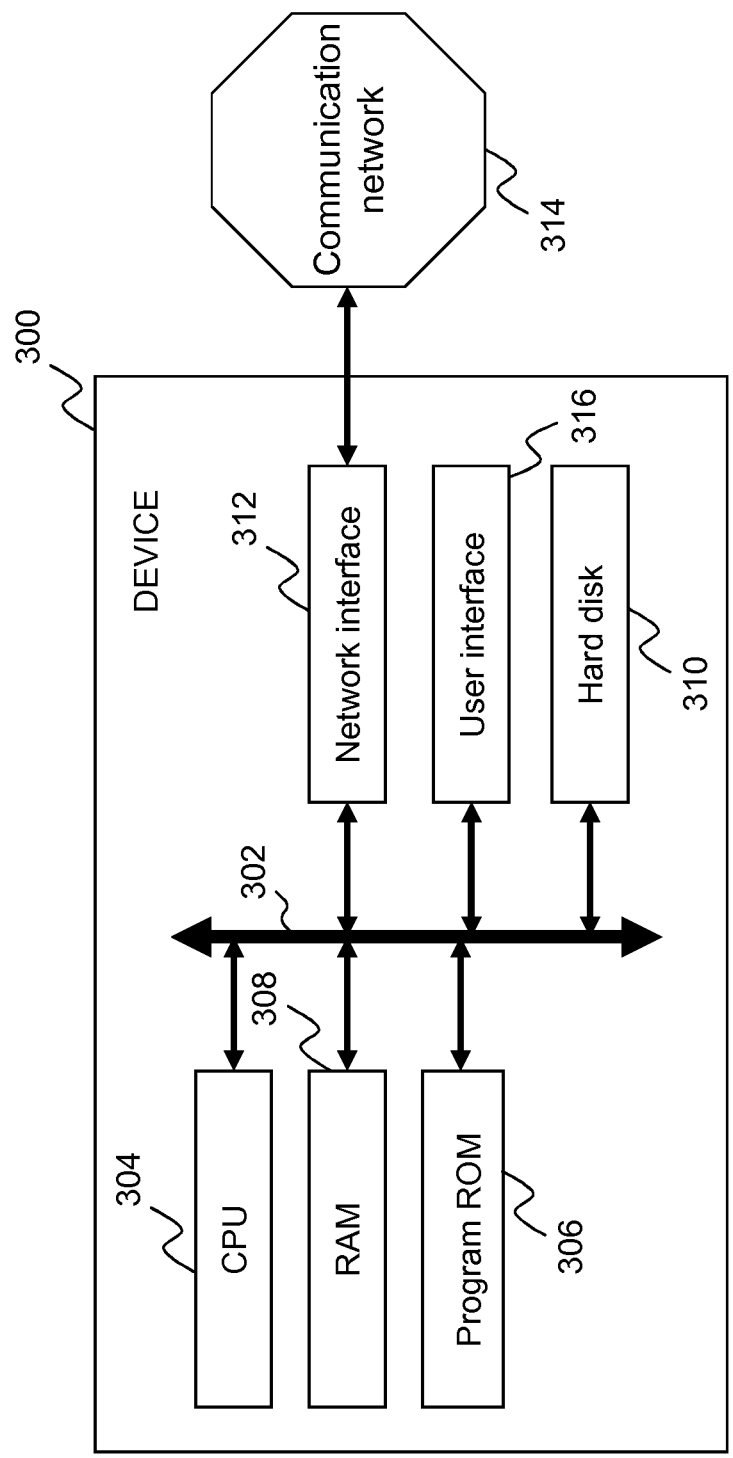
FIG. 3 represents a block diagram of a server or a client device in which one or more embodiments may be implemented.

FIG. 3 represents a block diagram of a server or a client device 300 in which steps of one or more embodiments may be implemented.

Preferably, the device 300 comprises a communication bus 302, a central processing unit (CPU) 304 capable of executing instructions from program ROM 306 on powering up of the device, and instructions relating to a software application from main memory 308 after the powering up. The main memory 308 is for example of Random Access Memory (RAM) type which functions as a working area of CPU 304 via the communication bus 302, and the memory capacity thereof can be expanded by an optional RAM connected to an expansion port (not illustrated). Instructions relating to the software application may be loaded to the main memory 308 from a hard disk (HD) 310 or the program ROM 306 for example. Such software application, when executed by the CPU 304, causes the encapsulation step described with reference to FIGS. 1 and 2 to be performed in the server.

Reference numeral 312 is a network interface that allows the connection of the device 300 to the communication network 314. The software application when executed by the CPU 304 is adapted to react to requests received through the network interface and to provide data streams and requests via the network to other devices.

Reference numeral 316 represents user interfaces to display information to, and/or receive inputs from, a user.

It should be pointed out here that, as a variant, the device 300 for managing the reception or sending of multimedia bit-streams can consist of one or more dedicated integrated circuits (ASIC) that are capable of implementing the method as described with reference to FIGS. 1, 2, and 3 These integrated circuits are for example and non-restrictively, integrated into an apparatus for generating or displaying video sequences and/or for listening to audio sequences.

Embodiments of the invention may be embedded in a device such as a camera, a smartphone, or a tablet that acts as a remote controller for a TV, for example to zoom into a particular region of interest. They can also be used from the same devices to have personalized browsing experience of a TV program by selecting specific areas of interest. Another usage of these devices by a user is to share selected sub-parts of his/her preferred videos with other connected devices. They can also be used in smartphone or tablet to monitor what happens in a specific area of a building placed under surveillance provided that the surveillance camera supports the generation part of this invention.

Naturally, in order to satisfy local and specific requirements, a person skilled in the art may apply to the solution described above many modifications and alterations all of which, however, are included within the scope of protection of the invention as defined by the following claims.

The invention claimed is:

1. A method for encapsulating multi-layer tiled timed media data in a server, the multi-layer tiled timed media data comprising a plurality of frames, at least one frame being partitioned into a plurality of tiles, each frame being encoded into a base layer and at least one enhancement layer, each tile being encoded into the base layer or the at least one enhancement layer, the method comprising:

obtaining at least one tile from at least one of the plurality of frames;

creating a track comprising the at least one obtained tile;

generating descriptive metadata associated with the created track, the descriptive metadata being organized into Sample Description Box, descriptive information about multi-layers being included into a sub-box as LHEVCTileSampleEntry of the Sample Description Box, wherein LHEVCTileSampleEntry of the Sample Description Box comprises a type parameter for signaling that the media data are multi-layer tiled media data and does not contain any LHEVCConfigurationBox, HEVCConfigurationBox or MPEG4ExtensionDescriptorsBox; and encapsulating the created track in a media file.

2. The method according to claim 1, wherein the tiles are encoded using a multi-layer extension of HEVC standard.

3. The method according to claim 1, wherein the value of the type parameter is 'lht1'.

4. The method according to claim 1, wherein descriptive information for configuring a decoding device according to the encoding method used for encoding the frames is included in a base layer base track, and/or a tile base track referred by the track resulting from the encapsulation of a tile being encoded into the at least one enhancement layer.

5. The method according to claim 1, wherein the type parameter is included in a second configuration sub-box contained in said main descriptive box, related to a track resulting from the encapsulation of a tile being encoded into the at least one enhancement layer, said second configuration sub-box comprising descriptive information for configuring a decoding device according to the encoding method used for encoding the frames, and wherein the descriptive information of the second configuration sub-box is compliant with the ISOBMFF standard.

6. The method according to claim 1, the method being compliant with ISO/IEC 14496-15.

7. The method according to claim 1, wherein one of the sub-box is the 'oinf' sub box or a sub-box listing layers and sub-layers carried in the created track.

8. The method of claim 1, wherein the type parameter is contained within a VisualSampleEntry descriptor.

9. The method of claim 1, wherein if the main descriptive box is related to a track related to a tile being encoded into the at least one second layer, then at least one sub-box of the main descriptive box comprises a type parameter for signaling that the media data are multi-layer tiled media data.

10. The method of claim 1, wherein if the main descriptive box is related to a track related to a tile being encoded into the at least one enhancement layer, then at least one sub-box of the main descriptive box comprises a type parameter for signaling that the media data are multi-layer tiled media data.

11. The method of claim 1, wherein the main descriptive box is related to a track resulting from the encapsulation of a tile being encoded into the at least one enhancement layer.

12. The method of claim 1, wherein the main descriptive box is related to a track resulting from the encapsulation of a tile being encoded into the at least one enhancement layer.

13. The method of claim 1, further comprising:
obtaining two or more tiles from at least one of the plurality of frames; and,
creating a track comprising the obtained two or more tiles and comprising tiles corresponding to the two or more tiles, each of the corresponding tiles belonging to a frame of the plurality of frames.

14. The method of claim 1, further comprising:
obtaining two or more tiles from among the plurality of tiles composing the first frame; and
creating a track comprising the obtained two or more tiles and comprising tiles corresponding to the two or more tiles, each of the corresponding tiles belonging to a frame of the plurality different from the first frame.

15. A method for providing a multi-layer timed media data bit-stream from multi-layer tiled timed media data encapsulated in at least one media file, multi-layer tiled timed media data comprising a plurality of frames, at least one frame being partitioned into a plurality of tiles, each frame being encoded into a base layer and at least one enhancement layer, each tile being encoded into at least the base layer or the at least one enhancement layer, the at least one media file comprising at least one track comprising at least one obtained tile from at least one of the plurality of frames, the at least one track further comprising corresponding tiles, the at least one media file being associated with a descriptive metadata associated with the at least one track, the descriptive metadata being organized into Sample Description Box, descriptive information about multi-layers being included into a sub-box as LHEVCTileSampleEntry of the Sample Description Box, wherein if the Sample Description Box is related to a track related to a tile being encoded into the at least one enhancement layer, then LHEVCTileSampleEntry of the Sample Description Box comprises a type parameter for signaling that the media data are multi-layer tiled media data and does not contain any LHEVCConfigurationBox, HEVCConfigurationBox or MPEG4ExtensionDescriptorsBox, the method comprising parsing the descriptive metadata to read the type parameter, using the type parameter to identify relevant data portions of the encapsulated media file, and providing the bit stream using the relevant data portions.

16. The method according to claim 15, wherein the tiles are encoded using a multi-layer extension of HEVC standard.

17. The method according to claim 15, wherein the type parameter is 'lht1'.

18. The method according to claim 15, wherein descriptive information for configuring a decoding device according to the encoding method used for encoding the frames is included in a base layer base track, and/or a tile base track corresponding to the track resulting from the encapsulation of a tile being encoded into the at least one enhancement layer.

19. The method according to claim 15, wherein the type parameter is included in a second configuration sub-box contained in said main descriptive box, related to a track resulting from the encapsulation of a tile being encoded into the at least one enhancement layer, said second configuration sub-box comprising descriptive information for configuring a decoding device according to the encoding method used for encoding the frames, and wherein the descriptive information of the second configuration sub-box is adapted to the ISOBMFF standard.

20. A method for providing a multi-layer timed media data bit-stream from multi-layer tiled timed media data encapsulated in at least one media file, in a server, the multi-layer tiled timed media data comprising a plurality of frames, at least one frame being encoded into a base layer and at least one enhancement layer, each tile being encoded into at least the base layer or the at least one enhancement layer, the at least one media file comprising at least one track comprising at least one tile obtained from at least one of the plurality of frames, the at least one track further comprising corresponding tiles, each of the corresponding tiles belonging to a frame of the plurality of frames, the at least one media file being associated with a descriptive metadata associated with the at least one track, the descriptive metadata being organized into Sample Description Box per base and enhancement layers, the descriptive information about the organization of the different layers being included into one sub-box as LHEVCTileSampleEntry of the Sample Description Box, wherein at most one Sample Description Box comprises the one sub-box.

21. The method according to claim 20, the method being compliant with ISO/IEC 14496-15.

22. The method according to claim 21, wherein one of the sub-box is the 'oinf' sub box or a sub-box listing layers and sub-layers carried in the created track.

23. The method of claim 20, wherein the multi-layer partitioned timed media data are multi-layer tiled timed media data, the subsamples being spatial subsamples.

* * * * *